March 19, 1946.   A. M. HATHAWAY   2,396,847
VIBRATION ELIMINATOR FOR SERVICE CORDS AND CONDUCTORS OF ELECTRICAL APPARATUS
Filed July 22, 1943
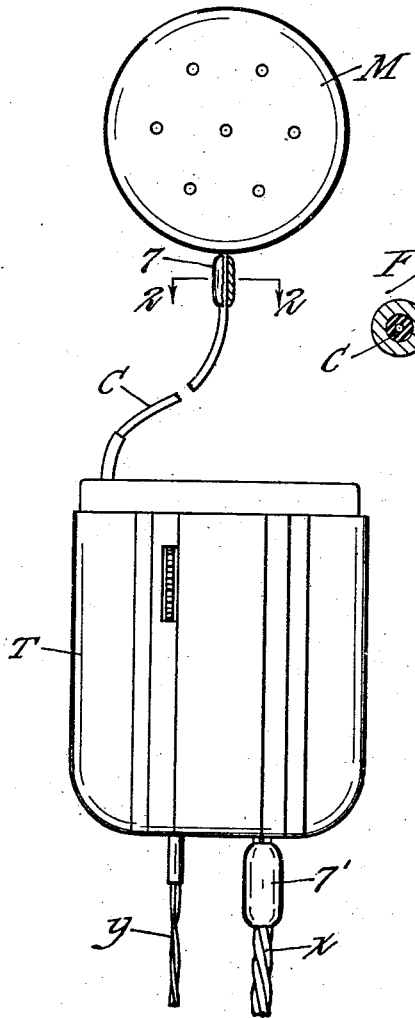
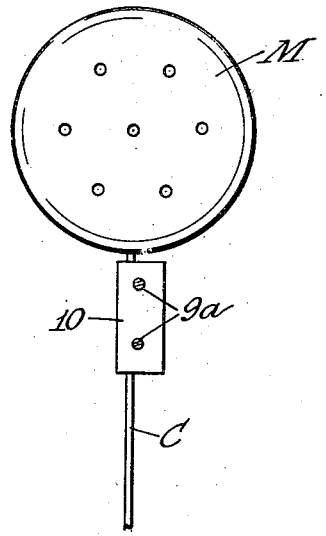
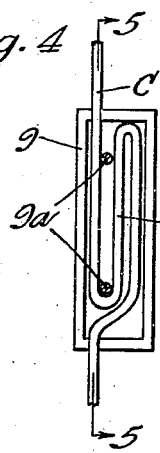
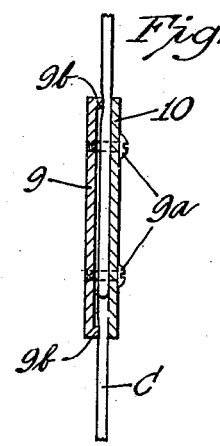
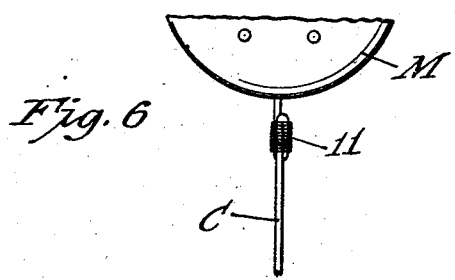
Inventor
Albert Morton Hathaway
By Williamson & Williamson
Attorneys Patented Mar. 19, 1946

2,396,847

UNITED STATES PATENT OFFICE 2,396,847

VIBRATION ELIMINATOR FOR SERVICE CORDS AND CONDUCTORS OF ELECTRICAL APPARATUS

Albert Morton Hathaway, Minneapolis, Minn., assignor to Johnston Brothers, Minneapolis, Minn., a partnership composed of William Edward Johnston and George H. Johnston Application July 22, 1943, Serial No. 495,708

6 Claims. (Cl. 179—107)

This invention relates to devices and methods for substantially eliminating the disruptive noises in audible electrical apparatus which are usually caused through vibrations externally set up in electrical service cords and conductors connected with the apparatus.

In such electrical apparatus as hearing aids, public address systems, radios and other sensitive electrical apparatus, conductors and electrical service cords are often loosely mounted or suspended with the result that through movement or friction on said conductors or cords, sound-creating vibrations are set up in the conductors or cords and are in turn communicated with sensitive pieces of electrical apparatus, such as transmitters, microphones, amplifiers, receiving sets and the like, to cause loud and disturbing noises to be set up from the loud speakers, earphones or other sound-producing mechanisms.

Likewise, in other sensitive electrical apparatus such as utilized in electronics, of types not employing sound, similar vibrations set up in suspended or loosely mounted conductors in service cords influence the accuracy of the apparatus and disturb the functioning thereof.

It is an object of my invention to provide a simple, proven and efficient method for substantially eliminating the disturbing effects from surface vibrations produced on electrical conductors or service cords for sensitive electrical apparatus.

A further object is the provision of very simple, but efficient apparatus for damping out and absorbing vibrations which are set up in suspended or loosely mounted conductors in service cords for sensitive electrical apparatus.

More specifically it is an object to provide a device or apparatus of the class described which may be readily attached and utilized in conjunction with a conductor or service cord itself and which it is thought, through several factors including weight or tension on a fixed connection of the cord, sound absorption through interposition of sound absorptive and non-conductive material and damping out through clamping action, substantially eliminates transmission of such vibrations to sensitive electrical apparatus with which the conductors or cords are connected.

These and other objects and advantages of my invention will be more apparent from the following description made in connection with the accompanying drawing, wherein like reference characters refer to the same parts throughout the several views, and in which—

Figure 1 shows a type of hearing aid device, using a microphone connected to the thermionic transmitter by a conventional flexible service cord and having embodied in the set both in the microphone cord and in the service cord or conductors for the battery, embodiments of my invention;

Figure 2 is a cross section on enlarged scale taken on the line 2—2 of Figure 1;

Figure 3 is a view showing a somewhat different form of my device applied to the electrical service cord connecting the microphone with the transmitter mechanism of a hearing aid;

Figure 4 is a front elevation of the device of Figure 3 with the outer clamping plate removed;

Figure 5 is a longitudinal section taken on the line 5—5 of Figure 4; and

Figure 6 is a fragmentary view showing still a different form of my invention applied to the microphone cord of a hearing aid device.

While it will, of course, be understood that my method and apparatus has wide application for sensitive electrical devices or apparatus of various types, as illustrative of the use and functions thereof, I have shown several embodiments applied to hearing aid sets. In Figures 1 and 2 I illustrate an embodiment of the invention applied to a hearing aid set comprising an electronic amplifier mechanism housed within a casing T and having electrically connected therewith, conductors disposed within and constituting a part of a conventional electrical service cord C which is connected with a conventional microphone M and adapted to be mounted in a pocket or upon the apparel or person of the wearer at a remote point from the amplifier mechanism T. The amplifier casing T has extended therefrom, in a more or less downwardly manner, an electrical service cord X containing the conductors for connection with the batteries for supplying the transmitter mechanism of the set. Earphone conductors Y also extend from the lower part of the transmitter casing T.

In such sensitive electrical apparatus, as the hearing aid device illustrated, air currents, body movements of the wearer and other influences cause movement of the electrical service cords, and set up in such cords externally thereof, vibrations which in conventional apparatus now in use, are generally transmitted externally to pieces of the apparatus and which affect the efficiency, sound or accurate operation of the apparatus. In the case of a hearing aid, such vibrations set up disruptive noises in the earphone or speaker of the set.

I have discovered that through the several functions obtained through the encircling attachment and preferably clamping of a non-resonant, relatively non-sound conductive member upon the cord adjacent to its connected end, such objectional vibrations and resultant effects are substantially damped out and absorbed with the result that practically no transmission thereof can take place to unfavorably affect operation of sensitive electrical apparatus. This sound absorbing and damping out of the non-sound conductive material and its mass, as well as the clamping or retaining of at least some small peripheral portion of the cord or conductor itself are contributing factors.

In the form of the vibration eliminator illustrated in Figures 1 and 2, a tubular vibration deadening member 7 is employed which may be constructed of metal, plastic or other material having preferably very low sound conductive qualities and which preferably, but not necessarily, has a relatively high specific gravity. Lead or plastic material is very suitable. This member 7 is tightly clamped about the portion of the cord closely adjacent to its fixed electrical connection with the microphone or other piece of electrical apparatus. Any suitable means for tightly clamping the member 7 about the cord C may be employed, preferably so that the entire circumference of the cord is tightly contacted. It is essential that the member 7 be spaced at least a slight distance from the apparatus, microphone or other member to which the cord is attached. In the form shown in Figures 1 and 2 the member 7 constructed of such metal as lead is molded directly about the encircled portion of the cord.

In Figure 1 a second vibration eliminator member 7' is applied in similar manner to the upper portion of the service cord X extending from the batteries.

In the functioning of the member 7 in conjunction with the cord it is thought the mass and sound absorption qualities of the eliminator deadens or eliminates a substantial amount of vibration and it is also thought that the encircling and clamping contact of the cord and the retaining of a portion of the cord adjacent the electrical apparatus in tight predetermined position also materially contributes to damping out vibrations and preventing transmission thereof.

In Figures 3 to 5 inclusive another form of my invention is shown applied to the microphone cord C of a hearing aid. In this form of the invention the flexible service cord C is tortuously bent upon itself forming a double or reverse bend and this bend is retained and confined within a shallow rectangular shell 9 having a pair of spaced retaining pins 9a projecting upwardly from the bottom thereof. Retaining pins 9a may be conveniently provided by the clamping screws, later to be described. One loop of the bend B is trained about the pins 9a, as clearly shown in Figure 4, and the other loop of the double bend is positioned between the pins and the opposite side flange of the shell member. The shell 9 has semi-circular recesses 9b formed in the ends thereof for accommodation and clamping of the service cord C at points just beyond the double bend. A flat plate 10 cooperates with the shell 9 to enclose the bend B of the cord and to form a clamp, said plate being of an area to cover the open face of the shell 9 and being clamped thereto by headed clamping screws 9a which constitute the retaining pins previously described. The threaded ends of the clamping screw 9a are received in internally threaded apertures formed in the body portion of shell 9 and function to tightly clamp portions of the cord C just above and below the double bend B with the bend retained and housed within the clamping structure.

In this form of the invention the weight of the boxlike clamping structure, including shell 9 and plate 10 and the weight of the cord suspended therefrom, tensions the upper end of cord C connected with the microphone, thereby damping out any vibrations produced upon the lower portion of cord C. The cord is also tightly clamped at two encircled portions and is further reversely or tortuously bent upon itself, all of which contribute to absorbing and damping out any vibrations produced upon the loose portion of the cord. Said sound-producing vibrations are thus prevented from being transmitted to the mechanism of the microphone. The shell 9 and plate 10 are preferably constructed of relatively non-sound-conducting material.

In Figure 6 another form of the invention applied to the microphone cord C is shown comprising a double or reverse bend in the cord itself tightly encircled and clamped by a winding 11 of suitable material, preferably having a relative high specific gravity, although successful results can be obtained from winding of fabric line or string. A metallic wire of relatively non-sound-conducting material is preferred and in this form of the invention, as in the form previously described, the tortuous bend of the cord itself as well as the clamping of this cord and the tension through the weight of the reversely bent cord and encircling binding, all contribute to damp out any sound-producing vibrations.

From the foregoing description it will be seen that I have provided a simple and efficient method for substantially eliminating the disturbing effects produced on loose and suspended electrical conductors or service cords.

It will further be seen that alternative, simple devices have been produced for accomplishing the objects and purposes enumerated in the introduction of this specification.

It will, of course, be understood that various changes may be made in the form, details, arrangements and proportions of the parts without departing from the scope of my invention.

What I claim is:

1. A device for substantially eliminating sound-creating vibrations on electrical service cords for microphone and the like having in combination with a service cord or conductor connected at one end with a microphone, a sound damping and sound absorptive member suspended in the manner of a weight and tightly clamped to said cord adjacent its said connection with said microphone, said member having at least a portion thereof completely encircling and clamping the periphery of said cord.

2. A device for substantially eliminating sound-creating vibrations on service cords for microphones and the like having in combination a double bent portion of the cord itself, the portion being disposed adjacent the connection of said cord with a microphone and a member surrounding said doubled portion of said cord to clamp the same and secured tightly to said cord and suspended therefrom.

3. A device for substantially eliminating transmission of sound creating vibrations from electrical conductors and the like to a microphone or the like comprising a tortuously bent portion in the part of said conductor adjacent its stationary connection with said microphone and a clamping member constructed of relatively non-sound-conducting material having means for retaining said tortuously bent portion in position, said clamping member also having means for encircling and tightly clamping said conductor adjacent said bent portion.

4. The structure set forth in claim 3, said clamping member including also a housing encasing said tortuously bent portion of said conductor.

5. The method of substantially eliminating transmission of sound creating vibrations from an electrical service cord or the like to a microphone which consists in completely surrounding a portion of said cord adjacent its connection with said piece of apparatus with a mass of solid relatively non-sound-conducting material and placing said mass in clamping contact with the periphery of said cord.

6. A device for eliminating transmission of sound creating vibrations from an electrical service cord or the like to a microphone comprising a solid member constructed of non-resonant, sound absorptive material mounted upon said cord adjacent its fixed connection with said microphone, said member completely encircling a small portion of said cord and being in direct contact therewith.

ALBERT MORTON HATHAWAY.